UNITED STATES PATENT OFFICE 2,496,340

TRIALKYL SILANE DERIVATIVE OF RICINOLEIC ACID ESTER

Kenneth A. Earhart, Baltimore, Md., assignor to U. S. Industrial Chemicals, Inc., New York, N. Y., a corporation of Delaware No Drawing. Application November 27, 1948, Serial No. 62,431

3 Claims. (Cl. 260—448.8)

This invention relates to new compositions of matter which are useful plasticizers for nitrocellulose.

A great many plasticizers for nitrocellulose are known. There is a need in the art, however, for additional plasticizers which with nitrocellulose produce films of increased useful working temperature range and increased flexibility at low temperatures. In addition, there is a need in the art for additional plasticizers which, when combined with nitrocellulose, will yield films of high folding flexibility and of low elastic modulus.

It is the object of the present invention to provide improved plasticizers for nitrocellulose meeting the aforementioned requirements.

The aforementioned and other objects are accomplished in accordance with the present invention by providing a composition which consists essentially of a compound or compounds having the generic formula

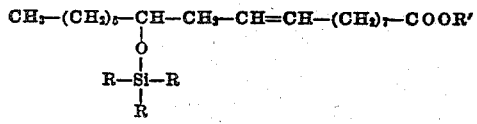

in which R and R′ are alkyl radicals having from one to eight carbon atoms. Preferably both R and R′ are normal alkyl radicals.

The following example illustrates in detail the preparation of a specific composition falling within the scope of the present invention, and is to be considered not limitative thereof.

Example

To a flask fitted with a stirrer, reflux take-off head and reflux condenser was added a mixture of 80 gms. of triethyl monoethoxy silane, 177.3 gms. of butyl ricinoleate prepared by the alcoholysis of castor oil with butyl alcohol, and 0.1 gms. of para-toluene sulfonic acid. The mixture was then refluxed until the reflux temperature was that of boiling ethyl alcohol, and the ethyl alcohol was thereafter removed by distilling the mixture, using the take-off head. After the final traces of ethyl alcohol had been removed from the mixture by means of a vacuum, there remained in the reaction flask a mixture which consisted essentially of the reaction product of one mole of butyl ricinoleate and one mole of triethyl monoethoxy silane having the structural formula

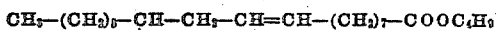
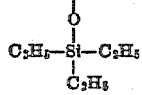

The composition prepared as described had a kinematic viscosity at 210° F. of 3.48 centistokes, a kinematic viscosity at 100° F. of 10.23 centistokes, a viscosity index of 224.3 and a refractive index of 1.4540.

Since castor oil is widely used in the art for plasticizing nitrocellulose films, a comparison was made between castor oil and the above composition when employed for that purpose. In making this comparison, nitrocellulose solutions were prepared according to the formulations listed in the table below.

| | | |
|---|---|---|
| Nitrocellulose, gm | 104.3 | 104.3 |
| AA castor oil, gm | 156.5 | |
| Composition of Example, gm | | 156.5 |
| Alcohol 2B, ml | 101.7 | 101.7 |
| Toluene, ml | 400.1 | 400.1 |
| Butyl acetate, ml | 237.4 | 237.4 |

The nitrocellulose used was a commercial grade, having a viscosity of 33 seconds and a nitrogen content of 11.8–12.2%, and the alcohol 2B contained 100 volumes of 200° proof ethyl alcohol per 0.5 volume of benzene.

A master batch of solution was first prepared by wetting the nitrocellulose with the non-solvents (Alcohol 2B and toluene), and then adding the butyl acetate. This mixture was then tumbled until the solution was completely homogeneous, after which the solution was filtered through a mat of glass wool, using pressure. The nitrocellulose solution and the plasticizer were thereafter weighed out in the correct proportions, and the mixture was again tumbled until it was completely homogeneous. Films were prepared by spreading the solution on glass by means of a doctor blade. The films thus laid down were conditioned at room temperature for 24 hours, followed by a further conditioning of 24 hours at 50° C. under forced air drying. The final thickness of the films was approximately 0.004″.

The properties of the films compared as is shown in the following table.

| | | |
|---|---|---|
| Nitrocellulose (33 sec.) | 104.3 | 104.3 |
| AA castor oil | 156.5 | |
| Composition of Example | | 156.5 |
| Elastic modulus, 50% stretch | 1,900 | 1,820 |
| Elongation at break, percent | 91 | 97 |
| Tensile strength, lbs./in.² | 2,500 | 2,355 |
| Spew point, °F | 165 | 201 |
| Cold crack, °F | +2 | −67 |
| MIT Flex Folds at 0° C | 800 | 1850 |
| Hardness, Sward rocker | 6 | 4 |

The MIT Flex Folds test involves holding a strip of film under a definite tension and bending it rapidly around a curved surface until failure occurs. This is a useful test for all types of papers, films, or packaging materials which are creased, bent sharply, or handled to a considerable extent during their useful life.

From the preceding table it is apparent that the film plasticized with the composition prepared as above described had a much lower elastic modulus than that plasticized with castor oil. As a result, the former film was more useful in the coating of fabrics, since a film having a low elastic modulus brings a soft feeling and good drape in coated fabrics, in contrast to a hard feeling and boardiness produced by films of high elastic modulus.

It is also apparent from the foregoing table that the composition prepared as described has a much wider useful range (the spread between the cold crack point and the spew point) than castor oil, the ranges being, respectively, 268° F. and 163° F.

A variety of modifications may be made in the specific procedure of the example to provide additional compositions falling within the scope of the present invention. Thus, such compositions may also be prepared by reacting methyl ricinoleate and trimethyl monoethoxy silane with removal of ethyl alcohol, ethyl ricinoleate and trimethyl monoethoxy silane with removal of ethyl alcohol, butyl ricinoleate and tri-isopropyl monomethoxy silane with removal of methyl alcohol, isobutyl ricinoleate and tri-n-butyl monoethoxy silane with removal of ethyl alcohol, n-amyl ricinoleate and tri-n-propyl monoethoxy silane with removal of ethyl alcohol, n-hexyl ricinoleate and tri-n-propyl monoethoxy silane with remooval of ethyl alcohol, 2-ethylhexyl ricinoleate and tri-n-butyl monoethoxy silane with removal of ethyl alcohol, etc. In addition, compositions falling within the scope of this invention may also be prepared by reacting a mixture of any of the aforementioned ricinoleates with a mixture of any of the aforementioned silanes. Furthermore, the R's of the generic formula need not be the same alkyl radical, diethyl n-butyl monoethoxy silane, ethyl di-n-butyl-monoethoxy silane, etc. also being useful in preparing the compositions described herein. The reaction mixture should contain substantially one mole of ricinoleate ester per mole of trialkyl monoalkoxy silane.

The compositions of the present invention supply a need in the art for additional plasticizers for nitrocellulose films, and are useful for that purpose in that the films thus prepared are characterized by a wide working range, by high folding flexibility, by a low elastic modulus and by other advantageous properties.

I claim:

1. A composition which is a useful plasticizer for nitrocellulose, the said composition consisting essentially of a compound having the generic formula

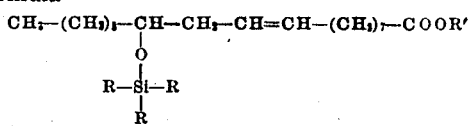

in which R and R' are alkyl radicals having from one to eight carbon atoms.

2. The composition of claim 1 in which R and R' are normal alkyl radicals.

3. The composition of claim 2 in which R is the ethyl radical and R' the n-butyl radical.

KENNETH A. EARHART.

REFERENCES CITED

The following references are of record in the file of this patent:

UNITED STATES PATENTS

| Number | Name | Date |
|---|---|---|
| 1,918,338 | Kaufman | July 18, 1933 |
| 2,270,352 | Sowa | Jan. 30, 1942 |

FOREIGN PATENTS

| Number | Country | Date |
|---|---|---|
| 625,077 | Germany | May 24, 1938 |

OTHER REFERENCES

Kreshkov Jour. Gen. Chem. (U. S. S. R.) vol. 17, (1947), pages 81–86.

Certificate of Correction

February 7, 1950

Patent No. 2,496,340

KENNETH A. EARHART

It is hereby certified that errors appear in the printed specification of the above numbered patent requiring correction as follows:

Column 2, line 17, for "Mutyl" read *Butyl*; column 3, line 31, for "remooval" read *removal*; column 4, line 35, list of references cited, for "Jan. 30, 1942" read *Jan. 20, 1942*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*